May 12, 1970
M. V. GAEDDERT ET AL
3,511,362
ROTOR HAVING RANDOMLY SPACED FOLDING TINES
Filed Jan. 31, 1968
3 Sheets-Sheet 1
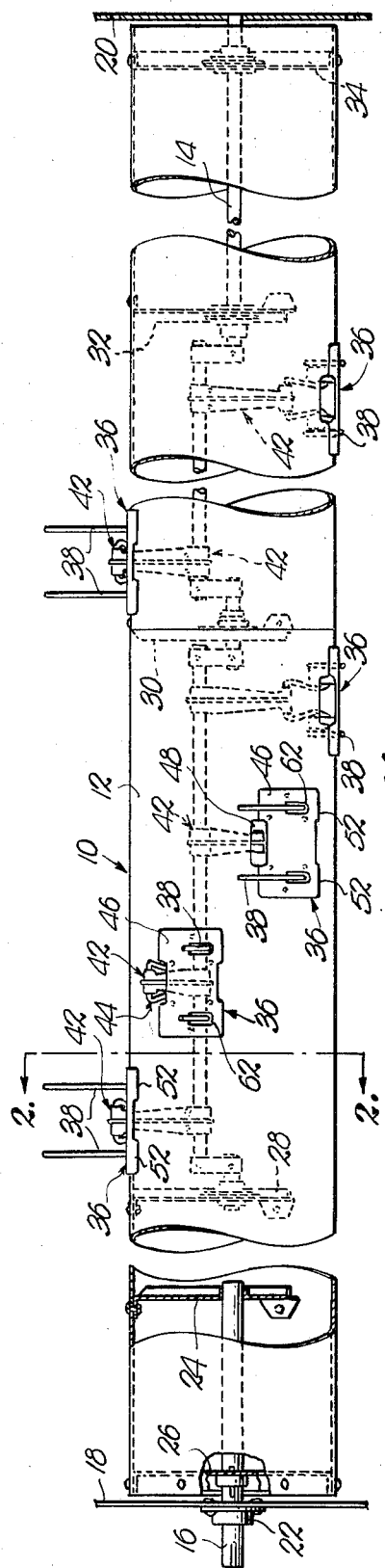
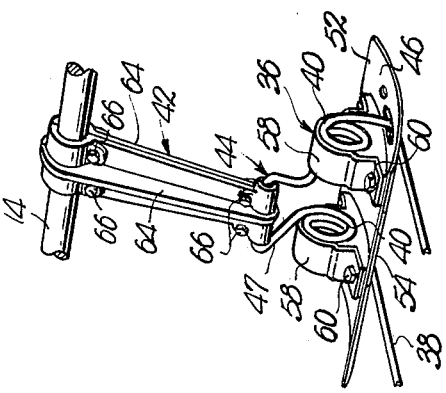
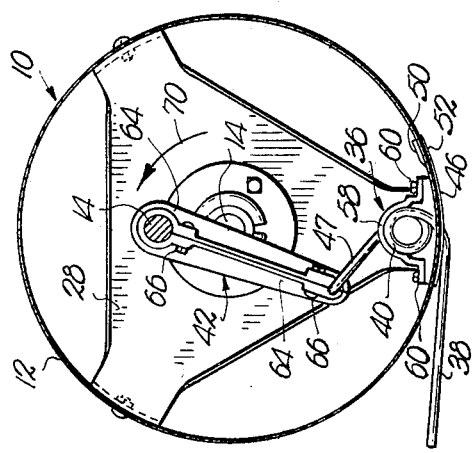
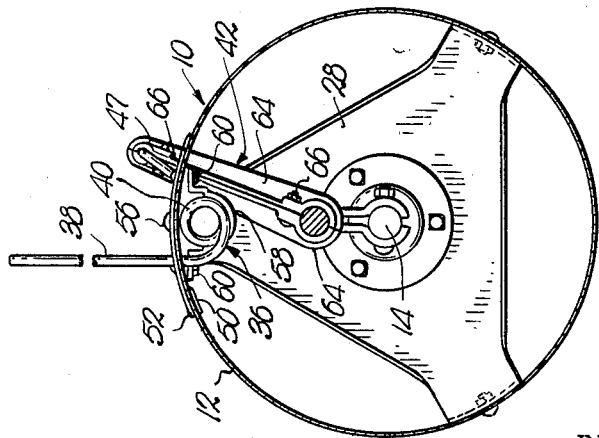
INVENTORS
Melvin V. Gaeddert
David J. Jordan
BY Schmidt, Johnson, Hovey,
Williams & Bradley
ATTORNEYS May 12, 1970 — M. V. GAEDDERT ET AL — 3,511,362

ROTOR HAVING RANDOMLY SPACED FOLDING TINES

Filed Jan. 31, 1968 — 3 Sheets-Sheet 2

INVENTORS
Melvin V. Gaeddert
David J. Jordan

BY Schmidt, Johnson, Hovey,
Williams & Bradley
ATTORNEYS

INVENTORS
Melvin V. Gaeddert
David J. Jordan

United States Patent Office 3,511,362
Patented May 12, 1970

3,511,362
ROTOR HAVING RANDOMLY SPACED FOLDING TINES
Melvin V. Gaeddert, and David J. Jordan, Newton, Kans., assignors to Hesston Corporation, Inc, Hesston, Kans, a corporation of Kansas
Filed Jan. 31, 1968, Ser. No. 702,071
Int. Cl. B65g 29/00; A01d 89/00
U.S. Cl. 198—211                                   5 Claims

ABSTRACT OF THE DISCLOSURE

A rotatable, bearing supported, coil spring has opposed extensions, one of which presents a tine that is folded back and projected alternately as the other extension is caused to swing. Use of a pair of such springs and bridging together the extensions to be actuated presents a double tine unit. A plurality of such units are randomly located on a rotatable tube and operably coupled with actuating apparatus in the tube so as to be responsive to tube rotation. When used in a harvester to handle cut crops the tines project outwardly from the tube during crop movement and lie back tangentially to slip smoothly from the crop when the tines are folded.

---

It is an important object of the present invention to provide for random distribution of a number of folding tine units on a rotatable tube so as to appreciably increase the material handling efficiency of the rotor while decreasing the number of tines needed for such purpose.

Another important object of the instant invention is the provision of a tine unit which embodies bearing supported coil springs that oscillate with respect to their bearings so as to present an inexpensive, smoothly operating, trouble-free, pivotal suport for the swingable tines that are integral with the springs.

Still another important object of our present invention is to provide a tine unit that may be quickly and easily removed from the tube for servicing or replacement, all of the components of the unit being also capable of simple disassembly to permit repair or substitution wih new parts when worn out or damaged.

A further important object of the present invention is to provide a tine unit having parts so formed and arranged as to permit use of plastic materials in their production, avoiding the need for lubrication, eliminating noisy operation, and reducing the cost of repair and replacement.

Many other objects and important features of our instant invention will be made clear or become apparent as the following specification progresses, reference being made to the accompanying drawing, wherein:

FIG. 1 is a front elevational view of a rotor having randomly spaced folding tines in accordance with one form of the present invention;

FIG. 2 is an enlarged cross-sectional view taken on line 2—2 or FIG. 1;

FIG. 3 is a view similar to FIG. 2 showing the rotor

FIG. 3 is a view similar to FIG. 2 showing the rotor rotated 180°;

FIG. 4 is a perspective view of one of the tine units connected with the actuating apparatus;

Figure 5:
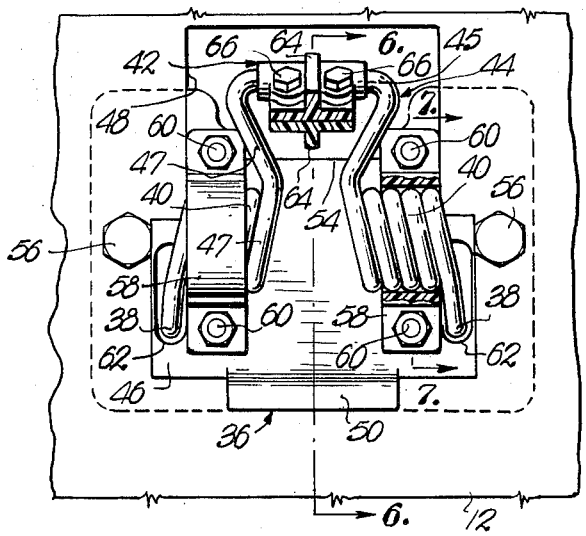
FIG. 5 is an inside view of one of the tin units still further enlarged.

In the form shown by FIGS. 1-7, rotor 10 has an elongated, hollow, cylindrical wall 12 supported for rotation about its longitudinal axis by a crank shaft 14 and a driven shaft 16, the latter being adapted for operable connection with any suitable power transmitting means (not shown). End plates 18 and 20 are held against rotation by their supports (not shown), the plate 18 having a bearing 22 for shaft 16, and the shaft 14 being rigidly secured to plate 20.

Wall 12 is mounted on shaft 16 by a bulkhead 24 and by an end 26 rigidly fixed therewithin, the latter being welded to shaft 16. Additional bulkheads 28, 30 and 32 and an end 34, all rigid to wall 12, receive the shaft 14 through bearings as shown.

A plurality of separate, spaced apart, multiple tine units 36 of identical nature are distributed at random both circumferentially and longitudinally of the wall 12. Each of the two tines 38 of each unit 36 has a coil spring 40 interposed therein. Shaft 14 operates as actuating apparatus for all of the units 36, and each unit 36 has mechanism which includes a plastic crank arm 42 for connecting the same with shaft 14. Such mechanism includes additionally bridge means 44 integrally interconnecting the springs 40 therebetween for oscillation together. Many other types of actuating apparatus may, however, be used in connection with the tine units 36.

Each unit 36 has a mount in the nature of an elongated transversely arcuate, bearing support plate 46 that extends across an opening 48 in wall 12. Plate 46 has offset ears 50 and 52 at one edge thereof interleaved with wall 12 at one end of opening 48, and a notch 54 at the opposite edge of plate 46. Removable bolts 56 hold plate 46 against the outer surface of wall 12.

Each plate 46 has plastic, split bearings 58 surrounding each spring 40 respectively and supporting the same for oscillation about an axis disposed in spaced parallelism to the axis of rotation of wall 12, bearing 58 being housed within the wall 12 and releasably joined to the inner face of plate 46 by bolts 60. A clearance slot 62 is provided in plate 46 for each tine respectively. Each crank arm 42 has a pair of mating sections 64 releasably clamped together in pivotal relation to the shaft 14 and to the corresponding bridge 44 by bolts 66.

Figure 8:
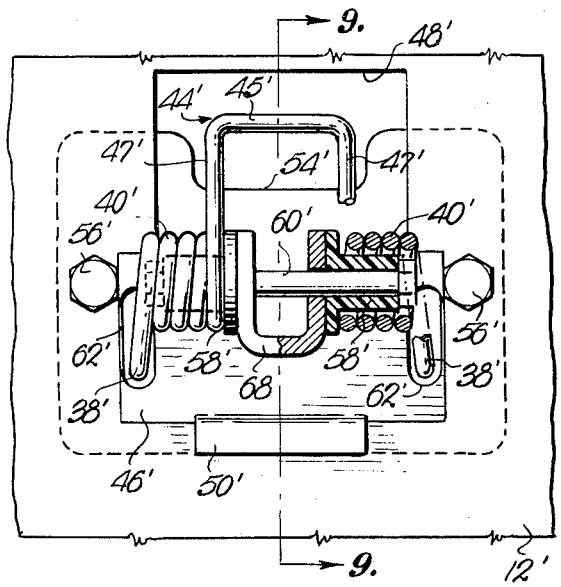
FIG. 8 is a view similar to FIG. 5 showing a slightly modified form of tine units.
Figure 9:
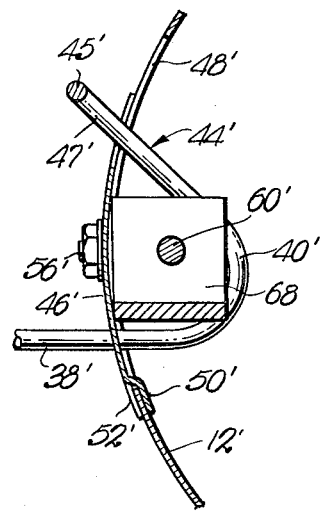
FIG. 9 is a cross-sectional view taken on line 9—9 of FIG. 8.
Figure 10:
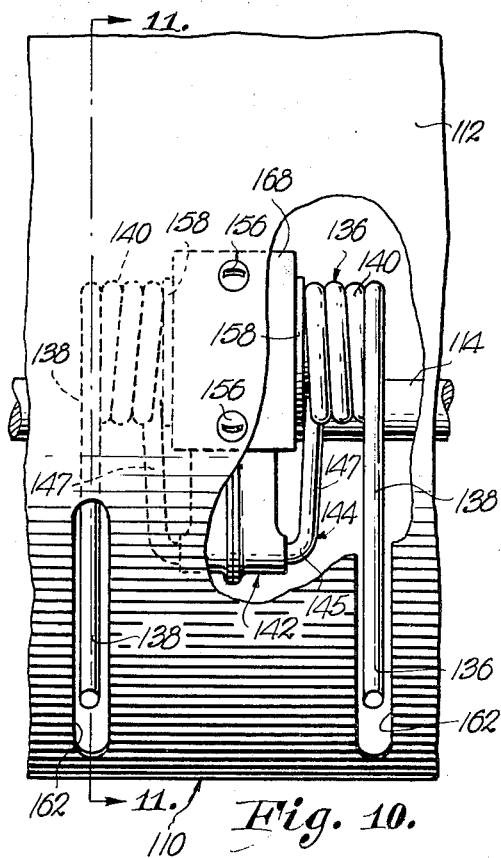
FIG. 10 is a fragmentary elevational view similar to FIG. 1, parts being broken away for clearness, showing another embodiment of the instant invention.
Figure 11:
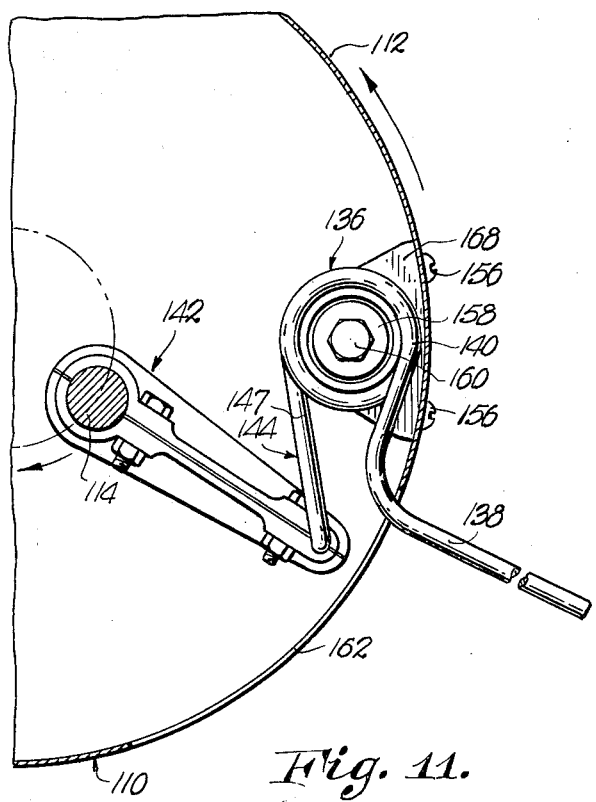
FIG. 11 is a fragmentary cross-sectional view taken on line 11—11 of FIG. 10.

In the modification of FIGS. 8 and 9, similar parts are identified by the same reference numerals, suitably primed. Bridge 44' differs from bridge 44 in shape only and the tines 38' extend from one end of their springs 40' precisely as in the case of tines 38. The U-shaped bridge 44' has its bight 45' (which receives crank arm 42) perpendicular to extensions 47' that are integral with springs 40' at their inner ends, and disposed so that the extensions 47' and tines 38' swing in substantially parallel planes. However, each tine 38', integral with its spring 40' at its outer end, is angularly offset from extension 47' circumferentially of spring 40' as seen best in FIG. 9. The same arrangement can be seen in FIGS. 2 and 3 notwithstanding the slight bends in extensions 47 of bridges 44 wherein the elongated bights 45 are parallel with the common axis of rotation of springs 40.

A U-shaped bracket 68 is rigidly secured to the inner face of plate 46' between tubular plastic bearings 58' which are surrounded by coil springs 40' and held in place by bolt 60' passing through bearings 58' and bracket 68.

OPERATION

Figure 6:
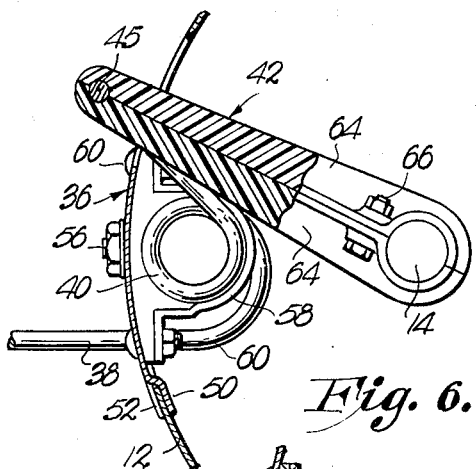
FIG. 6 is a cross-sectional view taken on line 6—6 of FIG. 5.
Figure 7:
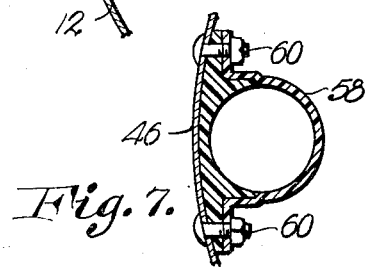
FIG. 7 is a cross-sectional view taken on line 7—7 of FIG. 5 but with the coil spring removed from the bearing.

In response to rotation of wall 12 by shaft 16, and with respect to the shaft 14 which does not rotate, the springs 40 and 40' oscillate within their bearings 58 and 58' respectively. This causes tines 38 and 38' to swing alternately from a folded position tangential to the outer surface of walls 12 and 12' (FIGS. 3 and 4) to an extended position projecting outwardly from and disposed substantially normal to such surface (FIGS. 2, 6 and 9). When the tines are extended the bridges 44 and 44' as well as the cranks 42 and 42' extend through the respective openings 48 and 48' (FIGS. 2, 6 and 9). When the tines are folded back, the cranks 42 and 42' and the bridges 44 and 44' are entirely housed within walls 12 and 12' (FIG. 3) because of the U-shaped relation between tines 38 and bridges 44 as seen in FIGS. 2 and 3, and as also seen in FIGS. 6 and 9 with respect to tines 38' and bridges 44'. This also permits placement of the tines on the outer periphery of the tube 12 rather than recessing the same in the latter.

As the wall 12 rotates in the direction of arrow 70 (FIG. 3) it carries the units 36 therewith and as they revolve concentrically about the axis of rotation of wall 12, bridges 44 pull on cranks 42 to cause them to swing freely on shaft 14 therearound and to pivot on bridges 44. No lubrication is required between sections 64 and shaft 14, between sections 64 and bridges 44, or between springs 40 and bearings 58, and the same is true with respect to springs 40' and bearings 58'. All wear is taken by the easily and quickly replaced, relatively inexpensive cranks 42, 42' and bearings 58, 58' which provide quiet, trouble-free operation.

Only one unit 36 at a time need be disassembled for repair and replacement of parts, as for example, in the event of a broken spring tine. It is but necessary to remove the two releasable fasteners 56 for plate 46 and then separate symmetrical sections 64 by removing the four releasable fasteners 66. The springs 40 are then detached from their holders 58 by simply removing the four releasable fasteners 60. In FIGS. 8 and 9 removal of the single releasable fastener 60' permits slipping of the holders 58' from within the springs 40'. All such maintenance operations may be accomplished from the outside of walls 12, 12' and, if desired, an entire unit 36 may be replaced for subsequent repair or substitution of worn or damaged parts with new or reconditioned components.

The many functions of springs 40, 40' in connection with their bearings 58, 58' cannot be overly stressed. They provide a yieldable bias of the tines in the direction of roation of the tube 12 and against the material being handled; they serve as the bearing mounting for the tines on the tube 12; they serve as the bearing mounting for the swinging bridges 44, 44' on the tube 12; and they serve as the means for transmitting movement from the control arms 42 to the tines or fingers 38, 38'.

The material handling assembly above described has many uses, particularly as an auger in harvesting machines, such as windrowers, wherein the cut crop is to be swept rearwardly from the cutter bar. The units 36 may also be used in connection with and between spaced, left and right hand flighting on tube 12 for directing the crop inwardly where it is then conveyed rearwardly by the random units 36. In each instance, since the fingers 38, 38' need not be recessed into wall 12, there is presented a smooth surface on the outer periphery of wall 12 which enhances feeding and results in reduced loses and shatter of the crop.

Since the units 36 are individually mounted they can be placed anywhere around the periphery of tube 12 in such manner as to be of best advantage in the feeding of hay conditioner rolls in windrowers and, in the case of combines, into the feeder house thereof. Moreover, fewer finger assemblies are needed when they can be placed at random, with equal or better results, than in constructions wherein the fingers must be strung along elongated shafts in a number of rows spaced circumferentially of the rotor 10. Such constructions are disadvantageous also from the standpoint of time and expense of maintenance and repair and replacement of parts.

In the embodiment of FIGS. 10–13, crank arm 142 on crankshaft 114 is the same as arm 42, receiving bight 145 of multiple tine unit 136. Each of the two tines 138 of unit 136 has a coil spring 140, but springs 140 are wound oppositely to springs 40 and each tine 138 is L-shaped as distinguished from the J-shaped tines 38 and 38'. Bridge 144 of unit 136 is similar to bridge 44', presenting extensions 147 substantially normal to bight 145.

A U-shaped bracket 168 is attached to the inner face of wall 112 of rotor 110 by bolts 156, and tubular plastic bearings 158 for springs 140 are attached to bracket 168 by volts 160. A clearance slot 162 is provided in wall 112 for each tine 138 respectively. Removal of the units 136 from within rotor 110 is accomplished through access openings (not shown) in wall 112 that are in turn provided with removable cover plates or other closures capable of being opened from the outside of rotor 110.

Figure 12:
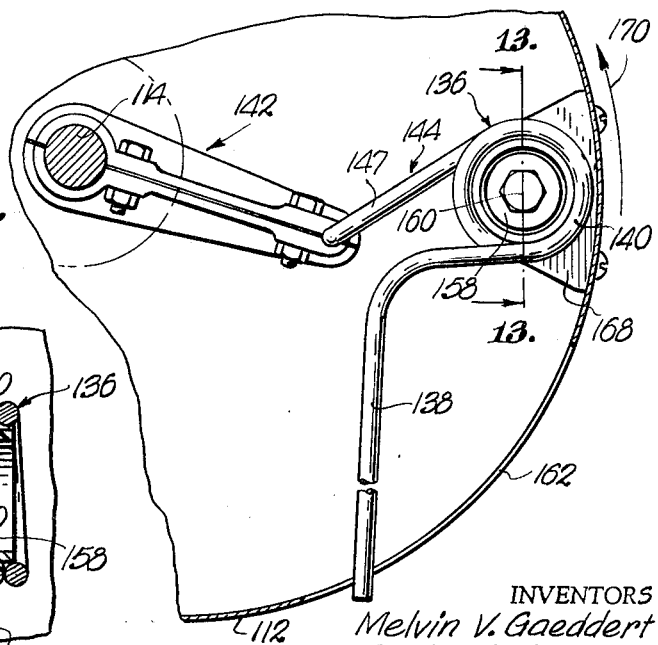
FIG. 12 is a fragmentary veiw similar to FIG. 3 showing the embodiments of FIGS. 10 and 11.
Figure 13:
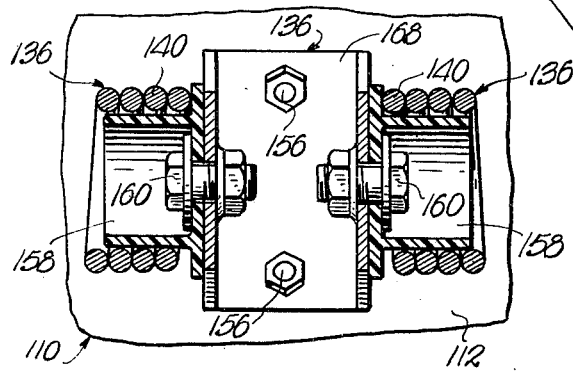
FIG. 13 is a fragmentary cross-sectional view taken on line 13—13 of FIG. 12.

Operation of the embodiment of FIGS. 10–13 is essentially the same as the form shown in FIGS. 1–7, and the modification of FIGS. 8 and 9, the crop load on the tines 138 tending to wind the springs 140 more tightly as in springs 40 and 40'. Moreover, the tines 138 not only fold back, as in the case of tines 38 and 38', but they retract into the rotor 110 as illustrated in FIG. 12, wiping the crop therefrom as they move in slots 162 from the position shown in FIG. 11 to that of FIG. 12, leaving the outer surface of wall 112 essentially smooth, and, therefore, free from a tendency of rotor 110 to wind the crop on the wall 112, the direction of rotation being shown by arrow 170.

The arms 142 and bridges 144 remain within rotor 110 at all times, and when tines 138 are in the position shown in FIG. 12, their legs form segments of chords or secants with respect to the curvature of wall 112.

Having thus described the invention, what is claimed as new and desired to be secured by Letters Patent is:

1. In a material handling assembly,
   a rotor provided with an elongated, tubular wall mounted for rotation about its longitudinal axis;
   a plurality of separate, spaced apart, multiple tine units distributed at random both circumferentially and longitudinally of said wall,
   each tine of each unit having a coil spring interposed therein;
   a mount for each tine respectively, each having means securing the same to said wall,
   each mount being provided with structure supporting the springs of its unit for oscillation about an axis disposed in spaced parallelism to said axis of rotation of said walls; and
   actuating apparatus within said wall,
   each unit having mechanism provided with means connecting the same with said apparatus and responsive to rotation of the wall for oscillating the same to swing the tines alternately from a folded position to an extended position projecting outwardly from and disposed substantially normal to the outer surface of said wall,
   said springs and said structures being within said wall,
   said wall having an opening adjacent each mount respectively,
   each mount including a plate on said surface across the corresponding opening, said structures being attached to the inner faces of the plates.

2. The invention of claim 1,
each plate having a clearance slot for each tine respectively of the corresponding unit.

3. The invention of claim 2,
each mechanism including bridge means interconnecting the springs for oscillation together and crank means pivotally receiving the bridge means.

4. The invention of claim 3,
each crank means and corresponding bridge means extending through the respective opening when the tines are in said extended position, and being housed within the wall when the tines are in said folded position.

5. The invention of claim 4,
said securing means comprising releasable fasteners attaching the plates to the wall, each crank means being releasable from its bridge means, rendering the units readily replaceable upon removal of said fasteners.

References Cited

UNITED STATES PATENTS

| | | | |
|---|---|---|---|
| 2,548,329 | 4/1951 | Van Sickle | 56—364 |
| 2,717,690 | 9/1955 | Dukelow | 198—211 |
| 2,748,921 | 6/1956 | White | 198—211 |
| 3,142,375 | 7/1964 | Luke | 198—211 |
| 3,282,408 | 11/1966 | Lohrentz | 198—211 |

ANTONIO F. GUIDA, Primary Examiner

56—364